US009674540B2

United States Patent
Wozniak et al.

(10) Patent No.: US 9,674,540 B2
(45) Date of Patent: Jun. 6, 2017

(54) PROCESSING PARAMETERS FOR OPERATIONS ON BLOCKS WHILE DECODING IMAGES

(71) Applicant: Microsoft Corporation, Redmond, WA (US)

(72) Inventors: Matthew Wozniak, Redmond, WA (US); Yongjun Wu, Bellevue, WA (US); Yuechuan Li, Issaquah, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/497,297

(22) Filed: Sep. 25, 2014

(65) Prior Publication Data

US 2016/0094854 A1     Mar. 31, 2016

(51) Int. Cl.
*H04N 19/46* (2014.01)
*H04N 19/44* (2014.01)
(Continued)

(52) U.S. Cl.
CPC ......... *H04N 19/44* (2014.11); *G06T 9/00* (2013.01); *H04N 19/46* (2014.11); *H04N 19/82* (2014.11)

(58) Field of Classification Search
CPC ...... H04N 19/44; H04N 19/61; H04N 19/159; H04N 19/172; H04N 19/70; H04N 19/89; H04N 19/436; H04N 19/46; H04N 19/176; H04N 19/42; H04N 19/91; H04N 19/127; H04N 19/13; H04N 19/132; H04N 19/423
(Continued)

(56) References Cited

U.S. PATENT DOCUMENTS 8,265,144 B2    9/2012 Christoffersen et al.
8,542,745 B2    9/2013 Zhang et al.
(Continued)

FOREIGN PATENT DOCUMENTS

CN    WO 2013155899 A1 * 10/2013 .......... H04N 19/463
WO    2013155899 A1    10/2013

OTHER PUBLICATIONS

Shen, et al., "Accelerate Video Decoding With Generic GPU", In IEEE Transactions on Circuits and Systems for Video Technology, vol. 15, Issue 5, May 2005, 9 pages.
(Continued)

*Primary Examiner* — Jamie Atala
*Assistant Examiner* — Ayman Abaza

(57) ABSTRACT

To decode encoded video using a computer with a central processing unit and a graphics processing unit as a coprocessor, parameters applied to blocks of intermediate image data are transferred from the central processing unit to the graphics processing unit. When the operation being performed applies to a small portion of the blocks of intermediate image data, then the central processing unit can transfer to the graphics processing unit the parameters for only those blocks to which the operation applies. In particular, the central processing unit can transfer a set of parameters for a limited number of blocks of intermediate image data, with an indication of the block to which each set of parameters applies, which both can improve speed of operation and can reduce power consumption.

20 Claims, 6 Drawing Sheets

(51) Int. Cl.
*G06T 9/00* (2006.01)
*H04N 19/82* (2014.01)

(58) Field of Classification Search
USPC .................................................... 375/240.25
See application file for complete search history.

(56) References Cited

U.S. PATENT DOCUMENTS

| | | | |
|---|---|---|---|
| 2007/0291858 A1* | 12/2007 | Hussain | H04N 19/44 375/240.29 |
| 2008/0056350 A1 | 3/2008 | Lyashevsky et al. | |
| 2009/0147849 A1 | 6/2009 | Au et al. | |
| 2013/0021350 A1 | 1/2013 | Schmit et al. | |
| 2013/0182759 A1 | 7/2013 | Kim et al. | |
| 2014/0098887 A1 | 4/2014 | Sermadevi et al. | |
| 2014/0177731 A1* | 6/2014 | Limberg | H03M 13/1515 375/240.25 |

OTHER PUBLICATIONS

Donner, et al., "Faster GPU Computations Using Adaptive Refinement", In the 31st International Conference on Computer Graphics and Interactive Techniques, Aug. 8, 2004, 1 pages.
"International Search Report & Written Opinion Issued in PCT Application No. PCT/US2015/050322", Mailed Date Dec. 17, 2015, 13 Pages.
"Second Written Opinion Issued in PCT Application No. PCT/US2015/050322", Mailed Date: May 3, 2016, 9 Pages.
"International Preliminary Report on Patentability Issued in PCT Application No. PCT/US2015/050322", Mailed Date: Aug. 4, 2016, 10 Pages.

* cited by examiner

PROCESSING PARAMETERS FOR OPERATIONS ON BLOCKS WHILE DECODING IMAGES

BACKGROUND

Digital media data, such as audio and video and still images, are commonly encoded into bitstreams that are transmitted or stored in data files, where the encoded bitstreams conform to established standards. An example of such a standard is a format called ISO/IEC 23008-2 MPEG-H Part 2, also called and ITU-T H.265, or HEVC or H.265. Herein, a bitstream that is encoded in accordance with this standard is called an HEVC-compliant bitstream.

Two operations, sample adaptive offset and deblocking, are performed on intermediate image data while decoding an image from an HEVC-compliant bitstream. More particularly, these operations process each block of the intermediate image data according to parameters for that block, which are stored in the encoded bitstream.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a system with a graphics processing unit as a coprocessor of a central processing unit, the graphics processing unit is programmed to perform various operations to decode an image. For sample adaptive offset and deblocking operations, the central processing unit processes the bitstream and, for each image, loads parameters for these operations into the graphics processing unit. For each image, the graphics processing unit then processes blocks of intermediate image data in parallel according to the received parameters.

To decode encoded video using a graphics processing unit as a coprocessor, parameters applied to blocks of intermediate image data are transferred from the central processing unit to the graphics processing unit. When the operation being performed applies to a small portion of the blocks of intermediate image data, then the central processing unit can transfer to the graphics processing unit the parameters for only those blocks to which the operation applies. In particular, the central processing unit can transfer a set of parameters for a limited number of blocks of intermediate image data, with an indication of the block to which each set of parameters applies. This kind of transfer reduces the amount of data transferred between the CPU and GPU and reduces the amount of computation performed by the GPU, thus improving speed of decoding and reducing power consumption. Otherwise, the central processing unit can transfer the set of parameters to be applied to all blocks of the intermediate image data. In this latter case, the block to which any particular set of parameters applies can be inferred from the ordering of the sets of parameters as received.

Two operations, sample adaptive offset and deblocking, are performed on intermediate image data while decoding an image from an HEVC-compliant bitstream. Such operations may be applied sparsely to the blocks of intermediate image data and can benefit from this technique.

In one implementation, whether an operation is sparsely applied can be determined by the central processing unit during decoding. However, an encoded image in an encoded bitstream can be analyzed at any time to determine whether the operation is sparsely applied to the encoded image. The set of parameters, and indications of the blocks to which they apply, can be determined for the image in advance of decoding and stored for later decoding. The set of parameters, and indications of the blocks to which they apply, can be determined at the time of encoding of the bitstream and can be stored in, or in association with, the encoded bitstream. Thus, the set of parameters can be available as prior knowledge for any decoder that subsequently uses the encoded bitstream. The encoded bitstream can include data indicating the how the parameters for an operation are stored, e.g., whether the stored data represents parameters and blocks or whether the stored data represents parameters for all blocks.

If the encoded bitstream includes or is associated with data indicating both a set of parameters for an operation and blocks of intermediate image data to which they apply, then any decoder can use the stored information even if the operation on the intermediate image data is not performed by a graphics coprocessor.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment for processing of encoded media data.

Figure 1:
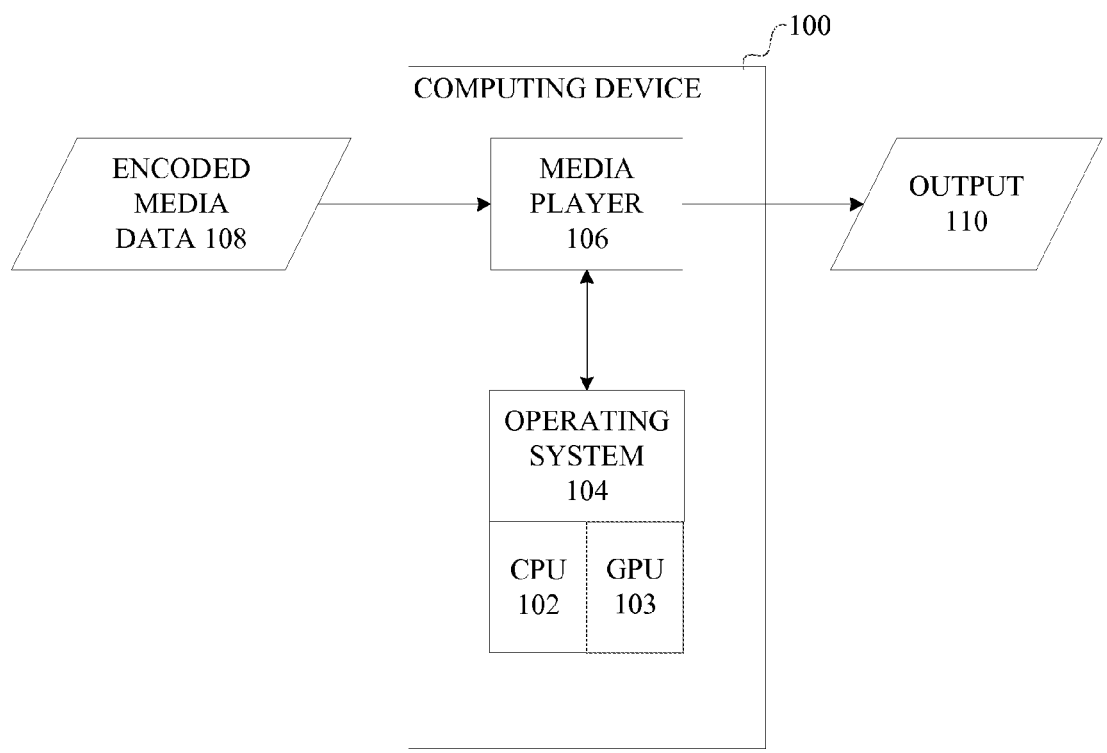
FIG. 1 is a block diagram of an example operating environment for playback of media.

Referring to FIG. 1, an example media processing system includes a computing device 100, which includes a central processing unit 102, graphics processing unit 103, an operating system 104 and a media processor 106. In this example, the media processor can be an application that runs on the operating system of the device, and the operating system manages access to the resources of the computing device, such as the central processing unit 102, graphics processing unit 103 and other components of the computing device. More details of the various resources of the computing device are described below in connection with FIG. 6.

The media processor 106 can implement, for example, a decoder that reads media data 108 which has been encoded into a bitstream that is compliant with a standard data form that the decoder is implemented to handle. For example, the media processor can be an HEVC-compliant decoder.

An encoded bitstream generally represents encoded digital media data, such as audio, video, still images, text and auxiliary information. If there are multiple media streams, such as audio and video, the streams of encoded data can be multiplexed into a single bitstream. Encoded bitstreams generally either are transmitted, in which case the may be referred to as streamed data, or are stored in data files. Encoded bitstreams, and files they are stored in, generally conform to established standards.

Many such standards specify structures of data, typically called packets but which may be called other names, which include metadata, providing data about the packet, and/or encoded media data, sometimes called essence data, and/or auxiliary information that is associated with the encoded media data, such as parameters for operations used to decode an image from a packet or set of packets. The specification of the standard defines which structures are required, which structures are optional, and what various structures, fields and field values mean.

A decoder implemented by the media processor 106 can be part of any application that reads and decodes the media data from the encoded bitstream to produce an output 110. The media processor 106 can be used by other applications (not shown) to provide media playback for that application.

In another implementation, the media processor 106 can implement a media file processor that is an application that receives encoded media data. The media file processor can be implemented in a similar way as the media file decoder in terms of its ability to read an encoded bitstream. Such a media file processor can analyze stored or transmitted bitstreams as part of an application that manages media data, such as a media file sharing application. A media file process can process media data to make the media data available within another system where the media data then can be used for a variety of purposes such as shared storage, archiving, editing, playback, distribution and the like.

Generally speaking, to decode or process media data 108 that includes encoded video data, a media processor 106 reads the bitstream and applies various operations to the encoded data according to parameters that also may be stored in the bitstream. For each image of video data to be output there may be one or more intermediate images produced by different stages of the decoding process. This intermediate data generally is divided into blocks, and each block is processed according to parameters defined for the block in the encoded bitstream.

In some implementations, a media decoder can be implemented so as to take advantage of parallelization and/or fast matrix, vector and other processing available through a graphics coprocessor. For example, a graphics processor can process blocks of image data in parallel for improved performance. An application can utilize and application programming interface (API) to a graphics library, where a media decoder is implemented as a shader within the graphics library. The API manages access the central processor, graphics coprocessor and memory resources of the computing device. Examples of commercially available API layers are the OpenGL interface from Khronos Group and the Direct3D interface from Microsoft Corporation. An application can also utilize the graphics coprocessor without using such an API.

To decode encoded video using a computing device 100 with a central processing unit 102 and a graphics processing unit (GPU) 103 as a coprocessor, parameters applied to blocks of intermediate image data generally are transferred from the central processing unit to the graphics processing unit. (Herein, the terms graphics processing unit, graphics coprocessor and GPU are intended to be synonymous).

When the operation being performed applies to a small number of the blocks of intermediate image data, then the central processing unit can transfer to the graphics processing unit the parameters for only those blocks to which the operation applies. In particular, the central processing unit can transfer a set of parameters for a limited number of blocks of intermediate image data, with an indication of the block to which each set of parameters applies. This kind of transfer reduces the amount of data transferred between the CPU and GPU and reduces the amount of computation performed by the GPU, thus improving speed of decoding and reducing power consumption.

Otherwise, the central processing unit can transfer the set of parameters to be applied to all blocks of the intermediate image data. In this latter case, the block to which any particular set of parameters applies is inferred from the ordering of the sets of parameters as received.

A decoder can apply either technique for processing intermediate image data depending on how sparsely the operation is applied to blocks of the intermediate image data. For example, if the operation is applied to only a few blocks, then the central processing unit can transfer a set of parameters for a limited number of blocks with an indication of the block to which each set of parameters applies. If the operation is applied to many blocks, then the central processing unit can transfer the set of parameters to be applied to all blocks of the intermediate image data.

As a particular example application, when decoding an image from an HEVC-compliant bitstream, there are at least two operations, sample adaptive offset and deblocking, which are performed on blocks of intermediate image data. Such operations may be applied sparsely to the blocks of intermediate image data and can benefit from this technique. Other operations that may be applied sparsely to blocks of intermediate data in other video compression operations also can benefit from this technique.

To determine whether an operation is applied sparsely to the blocks of an intermediate image, the encoded bitstream can be processed. The determination can be made by the media processor during or just prior to decoding of an image in the encoded bitstream. More generally though, an encoded image in an encoded bitstream can be analyzed at any time to determine whether an operation is sparsely applied on the encoded image. The set of parameters, and indications of the blocks to which they apply, can be determined in advance of decoding and stored for later decoding.

In one implementation, such a determination can be made as the encoded bitstream is created. The set of parameters, and indications of the blocks to which they apply, can be determined at the time of encoding of the bitstream and can be stored in, or in association with, the encoded bitstream. Thus, the set of parameters can be available as prior knowledge for any decoder that subsequently uses the encoded bitstream. The encoded bitstream can include data indicating the how the parameters for an operation are stored, e.g., whether the stored data represents parameters and blocks or whether the stored data represents parameters for all blocks.

This implementation avoids, at the time of decoding, analyzing parameters for each image to decide how to package and transfer the parameters to the GPU. Further, in this implementation, parameters can be analyzed once at the time of encoding, instead of upon each decoding operation. Subsequently, if the encoded bitstream includes or is associated with data indicating both a set of parameters for an operation and blocks of intermediate image data to which they apply, then any decoder can use the stored information even if the operation on the intermediate image data is not performed by a graphics coprocessor.

Figure 2:
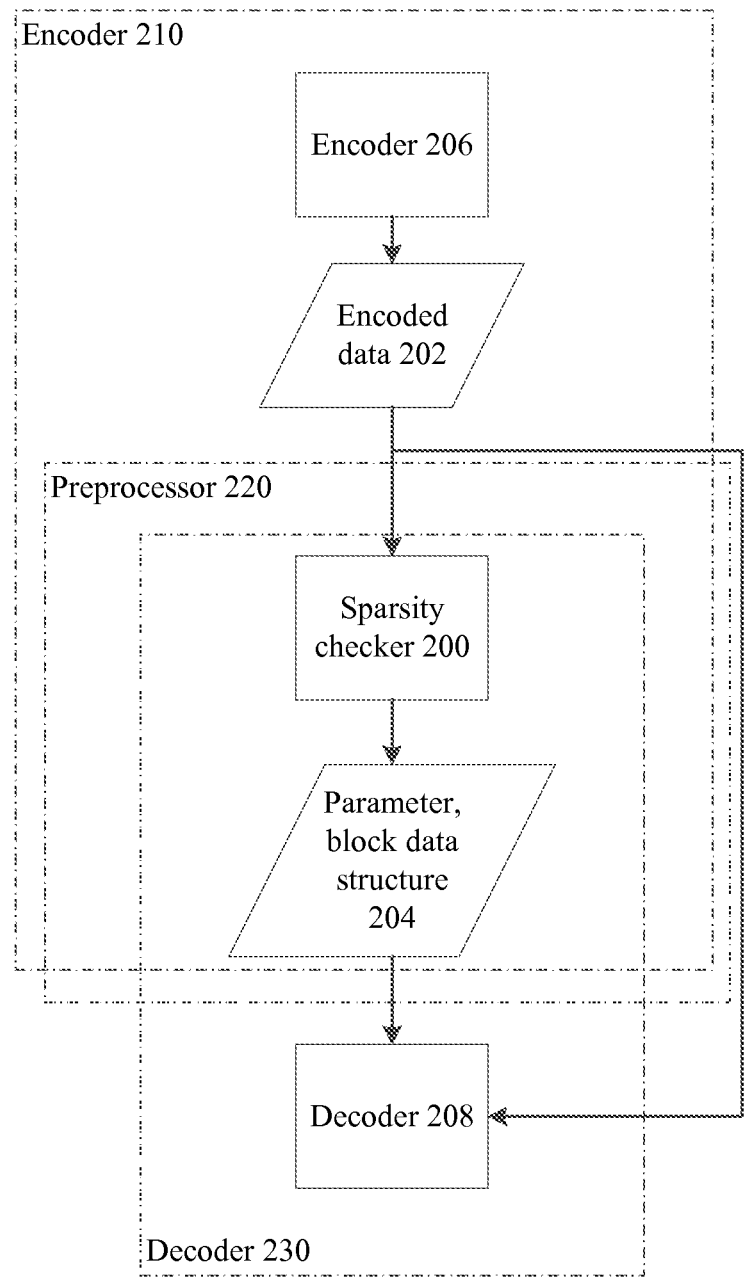
FIG. 2 is a block diagram illustrating a relationship between an encoder and decoder and an encoded bitstream.

These various implementations are represented by the data flow diagram of FIG. 2. In FIG. 2, a sparsity checker 200 processes encoded data 202 from an encoder 206 to determine if an operation is sparsely applied to blocks of intermedia image data for an image. If the operation is sparsely applied, then a data structure 204 is built providing each set of parameters and an indication of the block to which each set of parameters applies. The data structure 204 and encoded data 202 are provided to the decoder 208, in which a graphics coprocessor is provided the data structure 204.

In FIG. 2, it is noted that the sparsity checker 200 can reside within an encoder 210, a decoder 220 or a preprocessor 230, such as a media application that imports encoded media data into storage. Thus, the sparsity checker can be used at the time of encoding, at the time of decoding, or as a pre-processing step any time in between. If the sparsity checker is part of an encoder or preprocessor, then the data structure 204 may be part of the encoded data 202.

Figure 3:
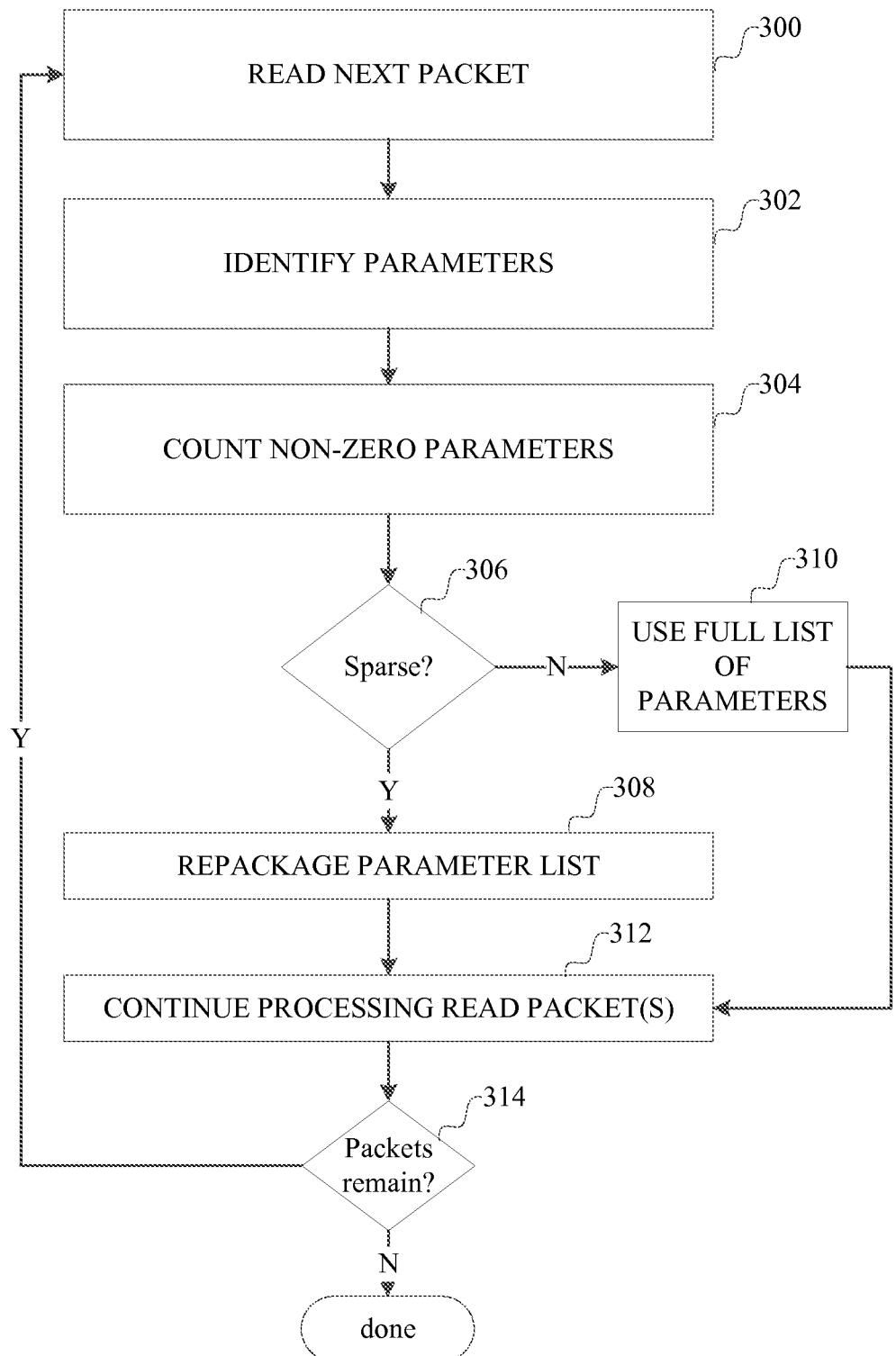
FIG. 3 is a flow chart describing an example implementation of a sparsity checker.

Referring now to FIG. 3, a flowchart describing an example operation of a sparsity checker will now be described. In this example, it is assumed that the encoded bitstream is already formed, includes a sequence of packets of data, and that each packet is read sequentially. The process begins by reading 300 a next packet to be processed from the bitstream. For purposes of simplicity and illustration, it is assumed that one packet corresponds to one output image. However, in practice, the processor may use information from older packets or may delay processing of current packet if processing requires some future packets. In the given packet, the parameters for an operation applied to blocks of intermediate image data for the output image are identified 302. The parameters generally are in a set sequence, such that the blocks to which they correspond are inferred from the ordering of the parameters. A number of non-zero parameters is identified 304.

Whether the parameters are sparse is determined at 306. For example, the number of blocks having non-zero parameters for the operation can be determined and compared to a threshold. A percentage of blocks having non-zero parameters can be used, because such a value is normalized across different image sizes. The threshold depends on the implementation, including, but not limited to, whether the measure of sparsity (e.g., number of blocks or percentage of blocks) and conditions under which it is more efficient to provide either the full list of parameters or the list of parameters and associated block identification data to the graphics coprocessor.

If the parameters are sparse, then the parameter list is repackaged 308 into a data structure that associates each set of parameters with a block to which the set of parameters corresponds. Otherwise the list of parameters remains unchanged, as indicated at 310. The parameters to be used for this output image then can be processed as indicated at 312. The processing of the parameters for an image can include storing them for later use or providing them to the graphics coprocessor, for example. If packets remain as determined at 314, then the next packet can be processed in a similar fashion, otherwise processing of the bitstream is completed.

Referring now to FIG. 3, a data flow diagram of an example implementation of a media decoder will now be described. The media decoder includes a packet processor 300 which receives an encoded bitstream 301 at an input, and extracts and outputs packet metadata 302 and essence (actual video, image or audio) data 304, both of which are placed in a buffer 306. Separate buffers can be provided for packet metadata data and essence. A constraint processor 308 analyzes the packet metadata 302 to determine whether constraints are met. The constraint processor can signal an event 310 indicating a constraint that is not met when such a condition occurs. The data from the buffer 306 is processed by a decoder 312 that produces output data 314, such as decoded audio, image or video data.

Figure 4:
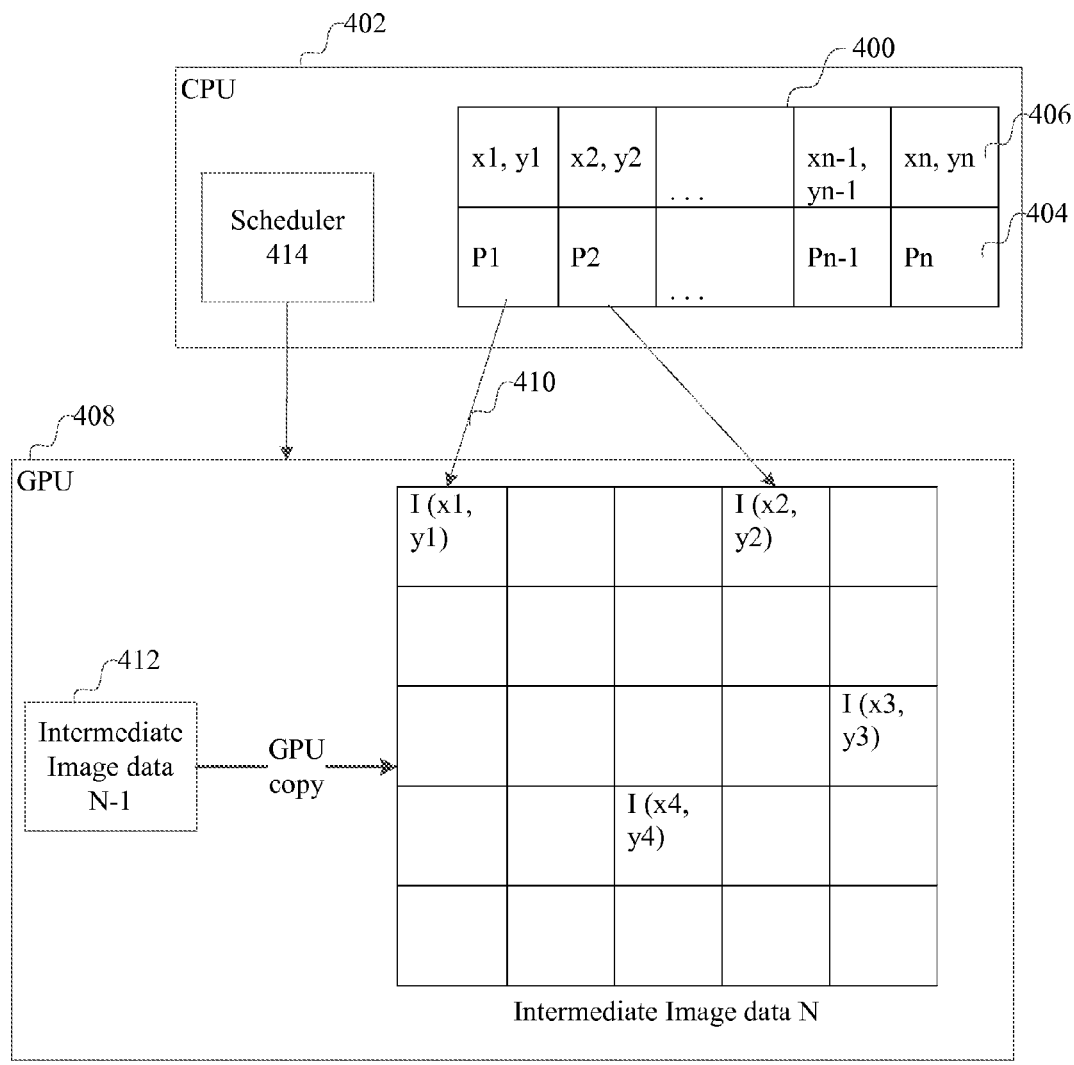
FIG. 4 is an illustration of operation of a graphics coprocessor in an example implementation.
Figure 5:
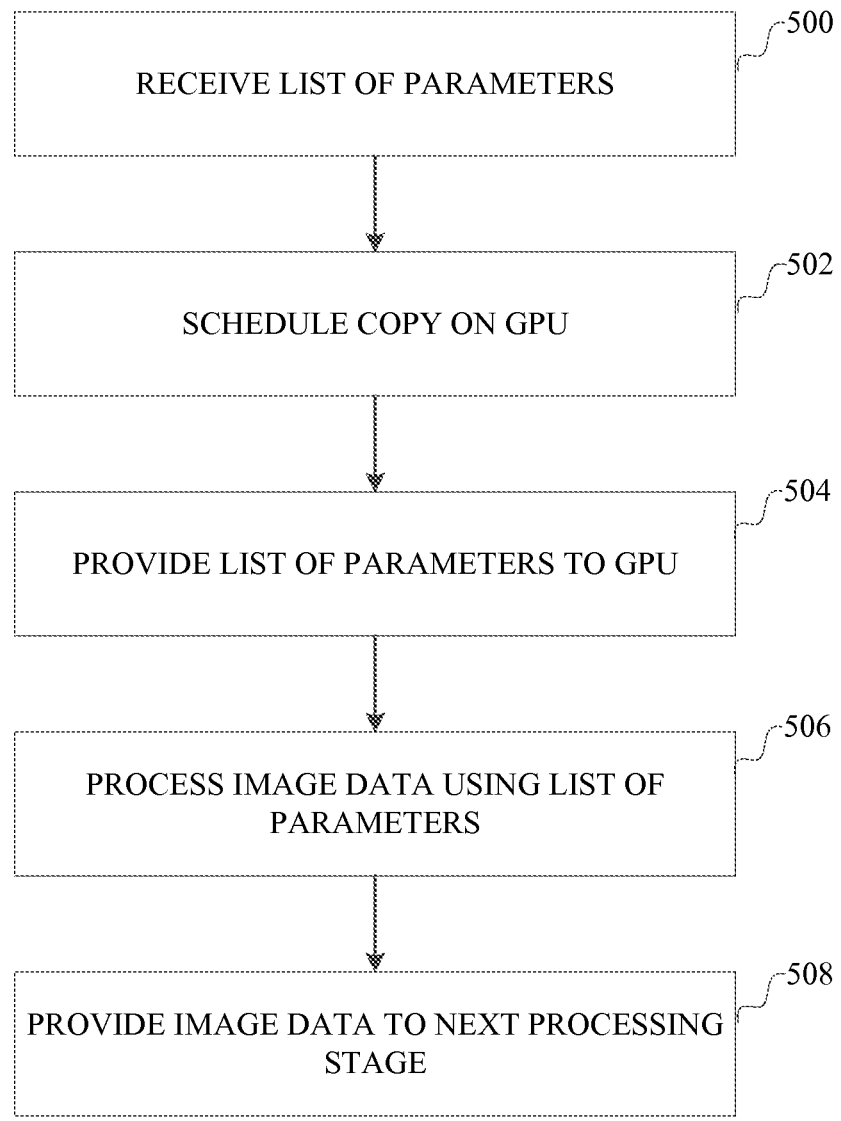
FIG. 5 is a flow chart of operation of a graphics coprocessor in an example implementation.

FIGS. 4 and 5 describe an example implementation of using the information about a sparsely applied operation to improve the efficiency of data transfer to a graphics coprocessor and improve the performance of the graphics coprocessor in producing an output image. The efficient data transfer and reduced operations by the graphics coprocessor reduce power consumption and increase processing speed.

In FIG. 4, the central processing unit (CPU 402) generates in memory a representation of a set of parameters, as indicated in FIG. 4 as parameter data 400. Each parameter 404 is associated with a block 406 of an intermediate image stored in the graphics coprocessor (GPU 408). For example, block "x1, y1" is associated with a set of parameters "P1". If there are n blocks for which the parameters are non-zero for this operation, then there are n entries in the parameter data 400. Block "x1, y1" corresponds to a block of intermediate image data to be generated in memory by the graphics coprocessor, as indicated at 410 as the output of a current stage N of decoding. Intermediate image data 412 resulting from a prior stage (N−1) of decoding is stored in memory of the graphics coprocessor. The central processing unit includes a scheduler 414 that instructs the GPU 408 to perform a copy operation using the parameter data 400. After the graphics coprocessor receives the instruction, the graphics coprocessor copies the intermediate image data 412 stored in its buffer into an output buffer 414 for the current operation to be performed, using the parameters 400. In doing so, the graphics coprocessor processes the copied blocks identified by the list of parameters 400 by applying parameters "P1" to block "I(x1,y1)". Due to the construction of the GPU 408, such blocks generally can be processed in parallel. Other blocks without corresponding parameters can simply be copied to the output buffer without processing. In some implementations, an actual copy operation may be avoided by having the GPU process blocks to be modified in place in the current buffer, leaving unmodified any blocks without parameters in the parameter data 400, and setting the modified buffer to be the output buffer for the Nth stage of decoding.

In FIG. 5, this operation can be described as follows. The central processing unit receives 500 the list of parameters and blocks to which those parameters apply. The central processing unit schedules 502 a copy of the intermediate image data currently in the graphics coprocessor into a processing buffer. The central processing unit provides 504 the list of parameters and blocks to the graphics processing unit. The graphics processing unit processes 506 the identified blocks with the corresponding parameters in the processing buffer. Such processing can be performed in parallel by the graphics processing unit. The resulting processed intermediate image data can then be provided 508 to the next stage of processing.

The foregoing examples are intended to illustrate, not limit, techniques used to identify sparsely applied block operations in an encoded bitstream. By identifying such sparsely applied operations, improved data transfer performance between a central processing unit and a graphics coprocessor can be achieved, along with improved performance by the graphics coprocessor.

Figure 6:
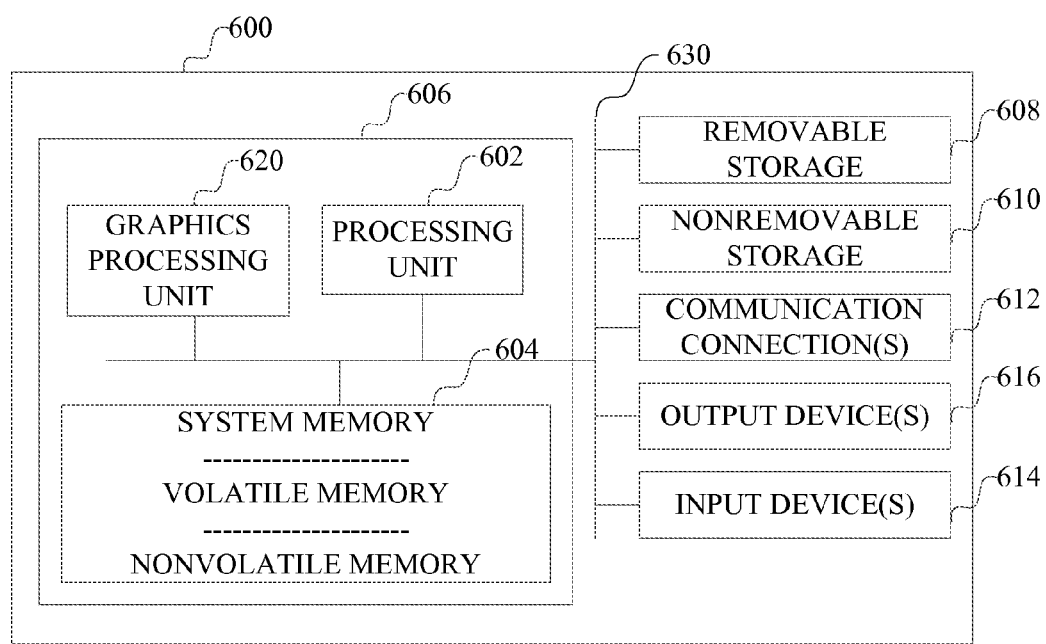
FIG. 6 is a block diagram of an example computing device with which components of such a system can be implemented.

Having now described an example implementation, FIG. 6 illustrates an example of a computing device in which such techniques can be implemented, whether implementing an encoder, decoder or preprocessor. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 6, an example computer 600 includes at least one processing unit 602 and memory 604. The computer can have multiple processing units 602. A processing unit 602 can include one or more processing cores (not shown) that operate independently of each other. Additional coprocessing units, such as graphics processing unit 620, also can be present in the computer. The memory 604 may be volatile (such as dynamic random access memory (DRAM) or other random access memory device), non-volatile (such as a read-only memory, flash memory, and the like) or some combination of the two. This configuration of memory is illustrated in FIG. 6 by dashed line 606. The computer 600 may include additional storage (removable and/or non-removable) including, but not limited to, magnetically-recorded or optically-recorded disks or tape. Such additional storage is illustrated in FIG. 6 by removable storage 608 and non-removable storage 610. The various components in FIG. 6 are generally interconnected by an interconnection mechanism, such as one or more buses 630.

A computer storage medium is any medium in which data can be stored in and retrieved from addressable physical storage locations by the computer. Computer storage media includes volatile and nonvolatile memory, and removable and non-removable storage media. Memory 604 and 606, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. The computer storage media can include combinations of multiple storage devices, such as a storage array, which can be managed by an operating system or file system to appear to the computer as one or more volumes of storage. Computer storage media and communication media are mutually exclusive categories of media.

Computer 600 may also include communications connection(s) 612 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, radio frequency, infrared and other wireless media. Communications connections 612 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media, and may perform various functions with respect to that data.

Computer 600 may have various input device(s) 614 such as a keyboard, mouse, pen, camera, touch input device, sensor (e.g., accelerometer or gyroscope), and so on. Output device(s) 616 such as a display, speakers, a printer, and so on may also be included. All of these devices are well known in the art and need not be discussed at length here. The input and output devices can be part of a housing that contains the various components of the computer in FIG. 6, or can be separable from that housing and connected to the computer through various connection interfaces, such as a serial bus, wireless communication connection and the like. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, hover, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (such as electroencephalogram techniques and related methods).

The various storage 610, communication connections 612, output devices 616 and input devices 614 can be integrated within a housing with the rest of the computer, or can be connected through input/output interface devices on the computer, in which case the reference numbers 610, 612, 614 and 616 can indicate either the interface for connection to a device or the device itself as the case may be.

A computer generally includes an operating system, which is a computer program running on the computer that manages access to the various resources of the computer by applications. There may be multiple applications. The various resources include the memory, storage, input devices and output devices, such as display devices and input devices as shown in FIG. 6. A file system generally is implemented as part of an operating system of the computer, but can be distinct from the operating system. The file system may be practiced in distributed computing environments where operations are performed by multiple computers that are linked through a communications network. In a distributed computing environment, computer programs may be located in both local and remote computer storage media and can be executed by processing units of different computers The operating system, file system and applications can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Accordingly, in one aspect a computer includes a means for generating a data structure including, for each set of parameters for an operation, data indicating a block of intermediate image data to be processed by the operation using the set of parameters. The data structure can include parameters and indications of blocks for the parameters for only those blocks with non-zero parameters for the operation.

In another aspect, a computer includes a means for transferring, to a graphics coprocessor, a data structure including, for each set of parameters for an operation, data indicating a block of intermediate image data to be processed by the operation using the set of parameters. The data structure can include parameters and indications of blocks for the parameters for only those blocks with non-zero parameters for the operation.

In another aspect, a computer includes a means for encoding video data to include a data structure including, for each set of parameters for an operation, data indicating a block of intermediate image data to be processed by the operation using the set of parameters. The data structure can include parameters and indications of blocks for the parameters for only those blocks with non-zero parameters for the operation.

In another aspect, a computer receives a bitstream of encoded data, the encoded data including parameters for operations to be performed on blocks of intermediate image data. The parameters are analyzed to determine whether the operation is sparsely applied to the intermediate image data. In response to determining that the parameters are sparsely applied to the intermediate image data, a representation of the parameters is generated to include, for each set of parameters to be applied to a block, an indication of the block to which the set of parameters is to be applied.

In any of the foregoing aspects, if the encoded bitstream includes or is associated with data indicating both a set of parameters for an operation and blocks of intermediate image data to which they apply, then decoding can use the stored information.

In any of the foregoing aspects, the bitstream can be decoded using the generated representation of the parameters.

In any of the foregoing aspects, the generated representation of the parameters can be stored in association with the bitstream. The generated representation of the parameters can be stored as metadata in a file that stores the encoded bitstream. The generated representation of the parameters can be stored as metadata associated with the file that stores the encoded bitstream. The generated representation of the parameters can be stored as metadata in the encoded bitstream in memory. The generated representation of the parameters can be stored as metadata in memory associated with the encoded bitstream.

In any of the foregoing aspects, the generated representation of the parameters can be provided to a graphics processing unit.

In any of the foregoing aspects, a graphics processing unit can be instructed to apply the generated representation of the parameters to intermediate image data.

In any of the foregoing aspects, analyzing the parameters to determine whether the operation is sparsely applied to the intermediate image data can include one of several tests. For example, one can determine a number of blocks having non-zero parameters for the operation. As another example, the percentage of blocks having non-zero parameters for the operation can be determined.

In any of the foregoing aspects, analyzing the parameters can be performed for each image in the bitstream.

Any of the foregoing aspects may be embodied in one or more computers, as any individual component of such a computer, as a process performed by one or more computers or any individual component of such a computer, or as an article of manufacture including computer storage with computer program instructions are stored and which, when processed by one or more computers, configure the one or more computers.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
   in a central processing unit:
      receiving a bitstream of encoded data, the encoded data including parameters for an operation to be performed on blocks of intermediate image data;
      analyzing the parameters to determine whether the operation is sparsely applied to the blocks of intermediate image data, wherein the analyzing the parameters includes the central processing unit counting a number of blocks of the intermediate image data having non-zero parameters for the operation and comparing the counted number of blocks of the intermediate image data having non-zero parameters for the operation to a threshold; and
      in response to determining that the parameters are sparsely applied to the intermediate image data, generating a representation of the parameters to include, for each set of parameters to be applied to a block, an indication of the block to which the set of parameters is to be applied and transferring the representation of the parameters to a graphics processing unit; and
   in the graphics processing unit:
      processing, using the representation of the parameters, only the blocks of the intermediate image data having non-zero parameters according to the operation.

2. The computer-implemented process of claim 1, further comprising decoding the bitstream using the generated representation of the parameters.

3. The computer-implemented process of claim 1, further comprising storing the generated representation of the parameters in association with the bitstream.

4. The computer-implemented process of claim 1, further comprising instructing the graphics processing unit to apply the generated representation of the parameters to the intermediate image data.

5. The computer-implemented process of claim 1, wherein the central processing unit performs the analyzing and generating for each image in the bitstream.

6. An article of manufacture comprising:
a computer storage medium;
computer program instructions stored on the computer storage medium which, when processed by a processing system including a central processing unit and a graphics processing unit, instruct the processing system to perform:
in the central processing unit:
receiving a bitstream of encoded data, the encoded data including parameters for an operation to be performed on blocks of intermediate image data;
analyzing the parameters to determine whether the operation is sparsely applied to the intermediate image data, wherein the analyzing the parameters includes the central processing unit counting a number of blocks of the intermediate image data having non-zero parameters for the operation and comparing the counted number of blocks of the intermediate image data having non-zero parameters for the operation to a threshold; and
in response to determining that the parameters are sparsely applied to the intermediate image data, generating a representation of the parameters to include, for each set of parameters to be applied to a block, an indication of the block to which the set of parameters is to be applied and transferring the representation of the parameters to the graphics processing unit; and
in the graphics processing unit:
processing, using the representation of the parameters, only the blocks of the intermediate image data having non-zero parameters according to the operation.

7. The article of manufacture of claim 6, further comprising decoding the bitstream using the generated representation of the parameters.

8. The article of manufacture of claim 6, further comprising storing the generated representation of the parameters in association with the bitstream.

9. The article of manufacture of claim 6, further comprising instructing the graphics processing unit to apply the generated representation of the parameters to the intermediate image data.

10. The article of manufacture of claim 6, wherein the central processing unit performs the analyzing and generating for each image in the bitstream.

11. A computer comprising:
a central processing unit operative to:
receive a bitstream of encoded data, the encoded data including parameters for an operation to be performed on blocks of intermediate image data;
count a number of blocks of the intermediate image data having non-zero parameters for the operation;
determine whether the operation is sparsely applied to the intermediate image data by comparing the counted number of blocks of the intermediate image data having non-zero parameters for the operation to a threshold;
in response to determining that the operation is sparsely applied to the intermediate image data, generate a representation of the parameters to include, for each set of parameters to be applied to a block, an indication of the block to which the set of parameters is to be applied; and
transfer the representation of the parameters to a graphics processing unit; and
the graphics processing unit operative to process, using the representation of the parameters, only the blocks of the intermediate image data having non-zero parameters according to the operation.

12. The computer of claim 11, wherein the graphics processing unit is further operative to decode the bitstream using the generated representation of the parameters.

13. The computer of claim 11, wherein the central processing unit is further operative to store the generated representation of the parameters in association with the bitstream.

14. The computer of claim 11, wherein the central processing unit is further operative to instruct the graphics processing unit to apply the generated representation of the parameters to the blocks of the intermediate image data.

15. The computer of claim 11, wherein the central processing unit is operative to determine whether the operation is sparsely applied and to generate the representation of the parameters for each image in the bitstream.

16. The computer-implemented process of claim 1, wherein the operation comprises a sample adaptive offset operation.

17. The computer-implemented process of claim 1, wherein the operation comprises a deblocking operation.

18. The article of manufacture of claim 6, wherein the operation comprises a sample adaptive offset operation.

19. The article of manufacture of claim 6, wherein the operation comprises a deblocking operation.

20. The computer of claim 11, wherein the operation comprises a sample adaptive offset operation.

* * * * *